(12) United States Patent
Lee et al.

(10) Patent No.: US 10,108,045 B2
(45) Date of Patent: Oct. 23, 2018

(54) REFLECTIVE DIFFUSION LENS, DISPLAY APPARATUS HAVING THE SAME

(71) Applicant: SAMSUNG ELECTRONICS CO., LTD., Suwon-si (KR)

(72) Inventors: Young Chol Lee, Hwaseong-si (KR); Yae Kyung Son, Uiwang-si (KR); Yong-hun Kwon, Anyang-si (KR); Jong Cheol Lee, Yongin-si (KR); Jae Hak Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 15/007,987

(22) Filed: Jan. 27, 2016

(65) Prior Publication Data

US 2016/0216561 A1  Jul. 28, 2016

(30) Foreign Application Priority Data

Jan. 27, 2015  (KR) .................. 10-2015-0012804

(51) Int. Cl.
*G02F 1/1335*  (2006.01)

(52) U.S. Cl.
CPC .. *G02F 1/133611* (2013.01); *G02F 1/133606* (2013.01); *G02F 2001/133607* (2013.01)

(58) Field of Classification Search
CPC ......... G02F 1/133611; G02F 1/133606; G02F 2001/133607
See application file for complete search history.

(56) References Cited

U.S. PATENT DOCUMENTS

| | | |
|---|---|---|
| 4,342,908 A | 8/1982 | Henningsen et al. |
| 4,859,043 A | 8/1989 | Carel et al. |
| 6,473,554 B1 | 10/2002 | Pelka et al. |
| 2002/0163808 A1 | 11/2002 | West et al. |
| 2016/0123554 A1* | 5/2016 | Kang ................ G02F 1/133606 362/97.1 |

* cited by examiner

*Primary Examiner* — Sonji Johnson
(74) *Attorney, Agent, or Firm* — Sughrue Mion, PLLC

(57) ABSTRACT

This is provided a display apparatus. The display apparatus a light source configured to emit a light; and a reflective diffusion lens configured to emit a light emitted from the light source to an upper direction or a lower direction with respect to a direction perpendicular to an optical axis of the light source through an incident surface, a lateral surface, and a reflective diffusion surface.

10 Claims, 10 Drawing Sheets

REFLECTIVE DIFFUSION LENS, DISPLAY APPARATUS HAVING THE SAME

CROSS-REFERENCE TO RELATED APPLICATION

This application claims priority of Korean Patent Application No. 10-2015-0012804, filed on Jan. 27, 2015 in the Korean Intellectual Property Office, the disclosure of which is incorporated herein by reference.

BACKGROUND

1. Field

Apparatuses consistent with exemplary embodiments relate to a reflective diffusion lens configured to diffuse a light emitted from a light source, and a display apparatus including the same.

2. Description of the Related Art

A display apparatus is configured to display a broadcast signal or image data in various formats. In general, the display apparatus includes a display panel configured to display an image.

The display panel may be classified into a self-illuminating display panel that emits a light by itself and a non-self-illuminating display panel that does not emit a light by itself. The self-illuminating display panel includes Cathode Ray Tube (CRT) panel, an Electro Luminescence (EL) panel, an Organic Light Emitting Diode (OLED) panel, a Vacuum Fluorescence Display (VFD) panel, a Field Emission Display (FED) panel, and a Plasma Display Panel (PDP). The non-self-illuminating display panel includes Liquid Crystal Display (LCD) panel.

A backlight unit is used for an LCD. The backlight unit may be classified into a light guide plate type and a direct backlight type.

SUMMARY

Therefore, it is an aspect of the exemplary embodiments to provide to a reflective diffusion lens capable of diffusing a light in a wider range of directions and a display device provided with the reflective diffusion lens.

Additional aspects of the exemplary embodiments will be set forth in part in the description which follows and, in part, will be obvious from the description, or may be learned by practice of the disclosure.

In accordance with one aspect of exemplary embodiments, there is provided a reflective diffusion lens including an incident surface configured to refract the light incident from the light source; a reflective surface configured to reflect the light refracted by the incident surface when a light incident from the light source is incident to a first predetermined area in the incident surface; and a lateral surface configured to refract the light reflected by the reflective surface and emit the refracted light, wherein the light refracted by the lateral surface may be emitted to an upper direction or a lower direction with respect to a perpendicular direction to an optical axis of the light source.

The incident surface, when a light incident from the light source is incident to the first predetermined area in the incident surface, may refract the light to the reflective surface, and the incident surface, when a light incident from the light source is incident to a second area of the incident surface, may refract the light to the lateral surface.

The lateral surface may have a curved surface, in which an angle between the optical axis of the light source and a tangent of the lateral surface decreases along with the increasing distance from the light source.

In accordance with another aspect of the exemplary embodiments, there is provided a reflective diffusion lens including an incident surface configured to refract a light incident from a light source; a lateral surface configured to reflect the light refracted by the incident surface when the light incident from the light source is incident to an area except a predetermined area of the incident surface; and a reflective surface configured to reflect the light reflected by the lateral surface wherein the lateral surface may be configured to refract the light reflected by the reflective surface and emit the refracted light in an upper direction or a lower direction with respect to a direction perpendicular to an optical axis of the light source.

The incident surface, when the light incident from the light source is incident to an area except for the predetermined area in the incident surface, may refract the light to the lateral surface, and the incident surface, when the light emitted from the light source is incident to the predetermined area in the incident surface, may refract the light to the reflective surface.

The lateral surface may have a curved surface, in which an angle between the optical axis of the light source and a tangent of the lateral surface decreases along with the increasing distance from the light source.

In accordance with another aspect of exemplary embodiments, there is provided a display apparatus including a light source configured to emit a light; and a reflective diffusion lens configured to emit a light emitted from the light source to an upper direction or a lower direction with respect to a direction perpendicular to an optical axis of the light source through an incident surface, a lateral surface, and a reflective diffusion surface.

The display apparatus may further include a reflective sheet disposed in a lower side of the light source and configured to reflect a light emitted by the reflective diffusion lens.

The incident surface may refract the light emitted from the light source to any one of the lateral surface and the reflective surface according to an incident angle of light emitted from the light source.

The lateral surface may reflect or refract the light entered thereto according to an angle of the light.

The lateral surface, when the light emitted from the light source is refracted from the incident surface to the reflective surface according to an incident angle, may refract the light reflected by the reflective surface.

The lateral surface, when the light emitted from the light source is refracted from the incident surface to the lateral surface according to an incident angle, may reflect the light refracted by the incident surface to the reflective surface.

The lateral surface may have a curved surface, in which an angle between the optical axis of the light source and a tangent of the lateral surface decreases along with the increasing distance from the light source.

The display apparatus may further include a reflective sheet disposed in a rear side of the reflective diffusion lens and configured to reflect the light emitted from the reflective diffusion lens.

The display apparatus may further include a display panel configured to generate an image based on the light emitted from the reflective diffusion lens.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the exemplary embodiments, examples of which are illustrated in the accompanying drawings.

Figure 1:
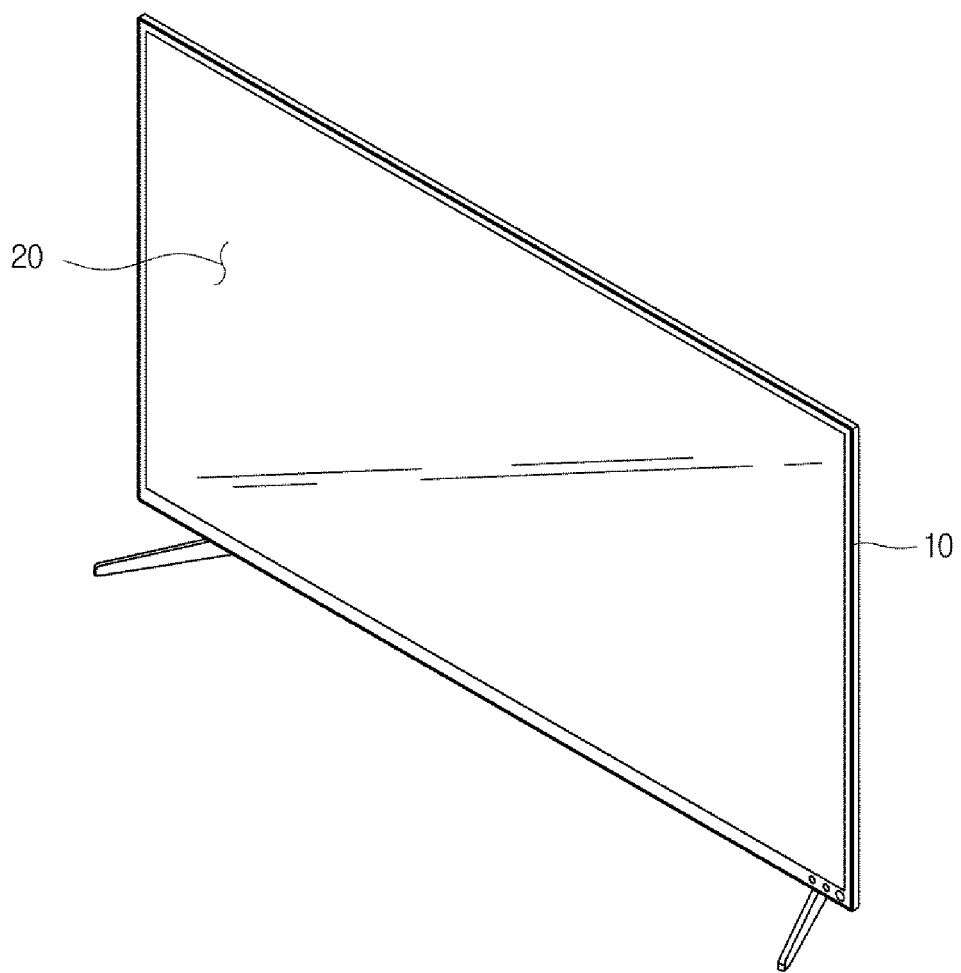
FIG. 1 is a view of an exterior of a display apparatus in accordance with an exemplary embodiment.
Figure 2:
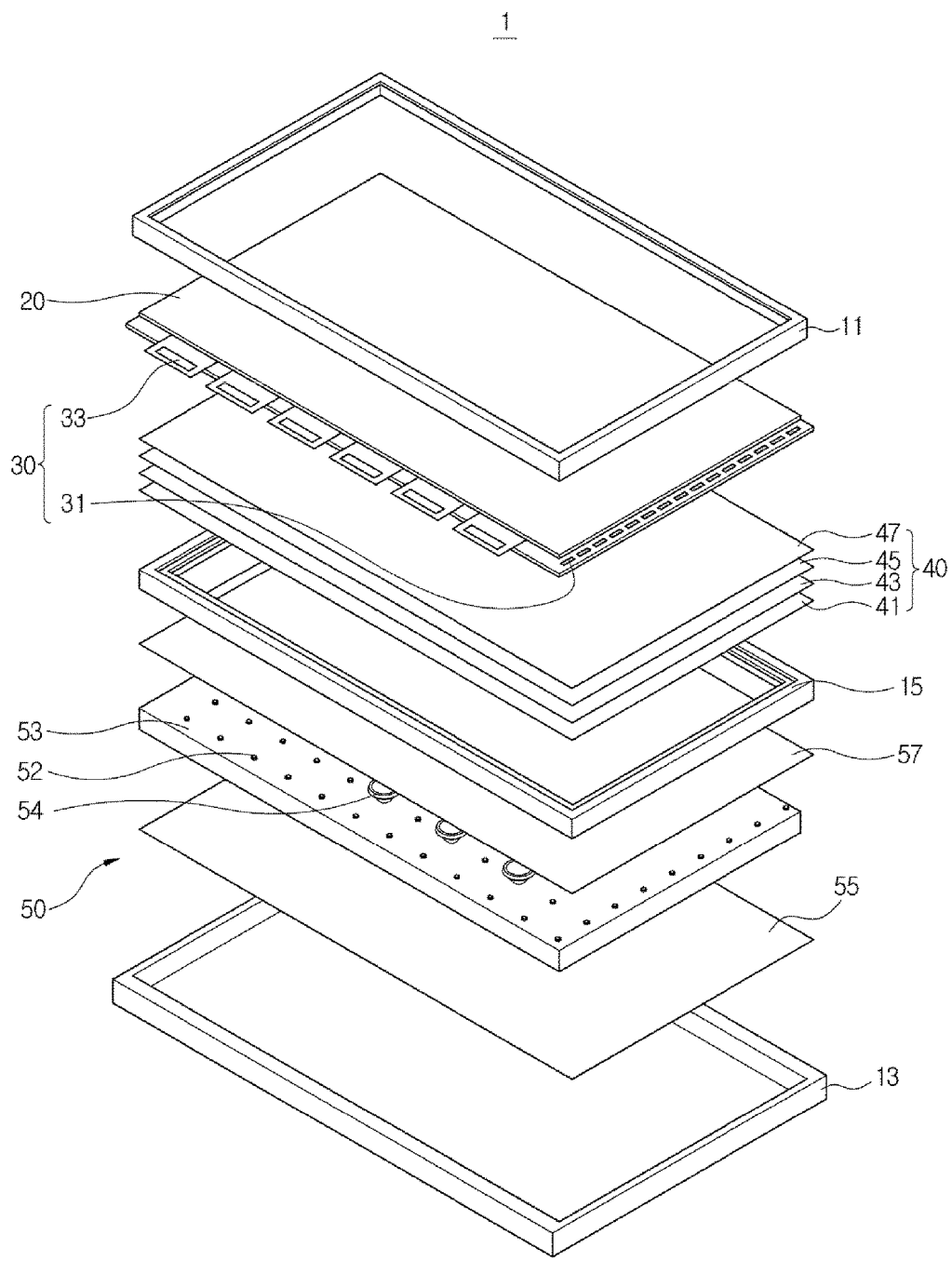
FIG. 2 is an exploded view of a display apparatus in accordance with an exemplary embodiment.
Figure 3:
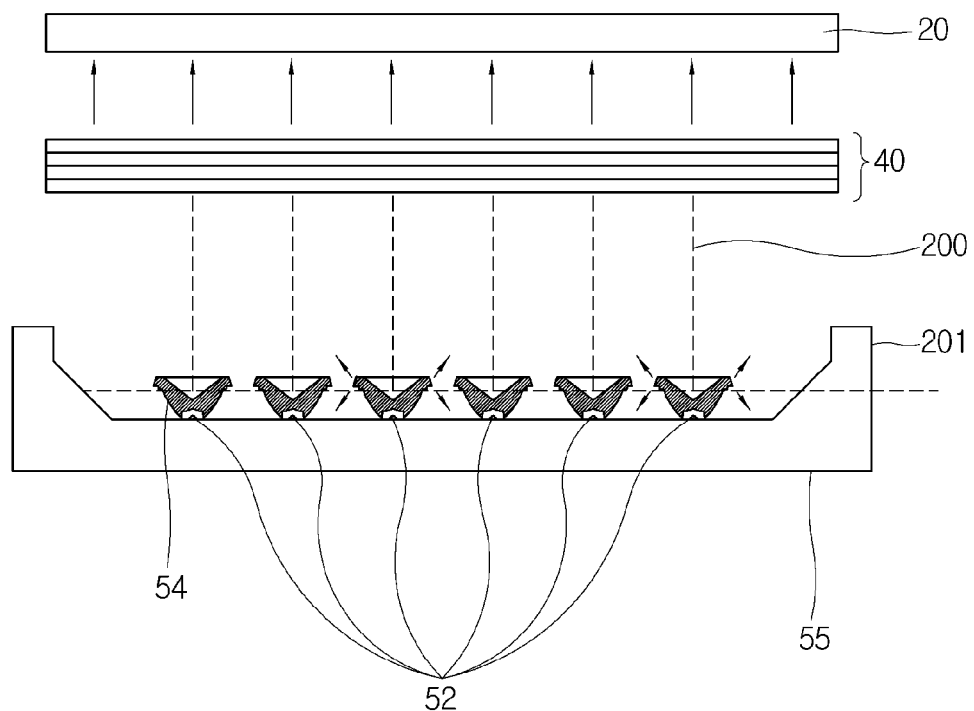
FIG. 3 is a cross-sectional view of a display apparatus in accordance with an exemplary embodiment.

FIG. 1 is a view of an exterior of a display apparatus in accordance with an exemplary embodiment, FIG. 2 is an exploded view of a display apparatus in accordance with an exemplary embodiment and FIG. 3 is a cross-sectional view of a display apparatus in accordance with an exemplary embodiment.

A display apparatus 1 is configured to process an image signal received from an external device and display the processed image. In an exemplary embodiment, the display apparatus 1 may be, but is not limited to, a Television (TV). In addition, the display apparatus 1 may be implemented by a monitor, a mobile multi-media device, a mobile communication device, and may include any type of devices as long as the device is able to display an image.

Referring to FIGS. 1 to 3, the display apparatus 1 may include a body 10 accommodating a variety of components and a display panel 20 displaying an image to a user. Inside of the body 10, a driving circuit 30, a backlight unit (BLU) 50, and a diffusion plate 40 may be provided.

Furthermore, in the body 10, as well as a variety of terminals connected to a variety of external devices, a button and a switch receiving an input of an operation command from a user may be provided. For example, as illustrated in FIG. 1, a terminal, e.g. Universal Serial Bus (USB) terminal and High Definition Multimedia Interface (HDMI) terminal, configured to support the connection with an external device may be provided on a lateral surface of the body 10.

As illustrated in FIG. 2, the body 10 may include a top chassis 11 provided in the front side of the display apparatus 1, a bottom chassis 13 provided in the rear side and a mold frame 15 provided inside the display apparatus 1.

The top chassis 11 may be provided in the same plane as the display panel 20, on which an image is displayed, to prevent an edge portion of the display panel 20 from being exposed. In addition, the bottom chassis 13 may be disposed on an opposite surface to the display panel 20 so that components included in the display apparatus 1 may not be exposed and thus the components included in the display apparatus 1 may be protected from an external impact.

The mold frame 15 may limit the movement of the display panel 20, the diffusion plate 40, and the backlight unit 50, and may fix the display panel 20, the diffusion plate 40 and the backlight unit 50 to the top chassis 11 and the bottom chassis 13.

The display panel 20 may display a variety of images according to an image signal input from an external device. The display panel 20 may be implemented by a light emitting display panel configured to emit a light by itself or by a non-light emitting display panel configured to generate an image by reflecting/transmitting/blocking a light generated by a light source.

In the following disclosure, it is assumed that the display panel 20 is a non-light emitting display panel, which generates an image by reflecting/transmitting/blocking a light emitted from the backlight unit 50 in a pixel-by-pixel base.

The display panel 20 may include liquid crystal layer, a transparent electrode layer, a transparent substrate and a color filter.

In the liquid crystal layer, a proper amount of liquid crystal may be provided. The liquid crystal may represent a state between a crystal and a liquid. The liquid crystal may have different optical characteristics according to the applied voltage. For example, a direction (rotation angle) of molecule constituting the liquid crystal may be changed according to the applied voltage.

A pair of transparent electrode layers may be provided in opposite sides of the liquid crystal panel. The transparent electrode layers respectively correspond to different voltage level to form an electric field (the voltage) applied on the liquid crystal layer. The transparent electrode layer may include a gate line, a data line and a Thin Film Transistor (TFT).

The gate line may be disposed in a row direction to turn on or turn off the TFT in response to a gate signal, and the data line may be disposed in a column direction to transmit a data signal to the plurality of pixels through the TFT. As mentioned above, the voltage applied to the liquid crystal panel may vary according to the data signal input via the data line. The direction of the molecule of the liquid crystal may vary according to the variation of the applied voltage.

A light may pass through or be blocked by the liquid crystal layer according to the molecule direction of the liquid crystal. The gate line and the data line may include Indium Tin Oxide (ITO) or Indium Zinc Oxide (IZO).

A pair of transparent substrate may form an exterior of the display panel 20, and protect the liquid crystal layer and the transparent electrode layer. The transparent substrate may include tempered glass or transparent film having great transparency.

The color filter may include a red filer, a blue filter or a green filter, all of which are formed in an area corresponding to each pixel so that colors are displayed in the plurality of pixels constituting the display panel 20.

The display panel 20 may generate an image by blocking or transmitting a light generated by the backlight unit 50. Particularly, each pixel of the display panel 20 may block or transmit a light of the backlight unit 50 so that an image having a variety of colors may be generated.

Meanwhile, the driving circuit 30 may provide a driving signal configured to drive the display panel 20. Referring to FIG. 2, the driving circuit 30 may include a gate driving circuit 31, and a data driving circuit 33.

The gate driving circuit 31 may transmit a gate signal to the gate line of the display panel 20. In addition, the data driving circuit 33 may transmit a data signal to the data line of the display panel 20.

The backlight unit 50 may be installed on the rear side of the display panel 20, and may generate a light so that the display panel 20 may generate an image. The type of the backlight unit 50 may be classified according to a position in which a light source is placed. For example, the backlight unit 50 may be classified into an edge type backlight unit (BLU) in which a light source is placed on at least one side of the display, and a direct type back light unit (BLU) in which a light source is placed on a rear side of the display panel 20.

Hereinafter it may be assumed that the backlight unit 50 is a direct type BLU in which a light source is placed on a rear side of the display panel 20.

As illustrated in FIGS. 2 and 3, the backlight unit 50 may include a plurality of light sources 52 generating a light, a plurality of reflective diffusion lens 54 surrounding the light sources 52, respectively, a circuit board 53 to which the plurality of light sources 52 are mounted, and a reflective sheet 55 provided on the rear surface of the circuit board 53 to reflect a light output. In addition, the backlight unit 50 may include a Quantum Dot Sheet 57 outputting a white light that is a mixture of various colors of light by receiving an emitted light.

The light source 52 may be an element configured to emit a light, and a plurality of light sources 52 may be mounted to the circuit board 53 to generate an image of the display panel 20. The light source 52 may be implemented with an light emitting diode (LED). However, the light source 52 may include any type of elements and devices as long as these elements or devices are able to generate and emit the light. The light source 52 may output a light (single color light) of a single wavelength (single color) or a mixture of light of a plurality of wavelengths (a white light). When the backlight unit 50 includes the quantum dot sheet 57, a light source configured to output a single color light (particularly, a blue color light having short wavelength) may be used as the light source 52

The circuit board 53 may be implemented by Printed Circuit Board or Flexible Copper Clad Laminate.

Referring to FIG. 2, in a front surface of the circuit board 53, the plurality of light sources 52 may be mounted. In the circuit board 53, an electrode pattern or a circuit pattern may be formed, and the light sources 52 and the circuit board 53 may be electrically connected to each other by wire bonding or flip-chip bonding.

As illustrated in FIG. 3, the light source 52 may be disposed in a rear side of the display panel 20, and a light emitted from the light source 52 may be diffused through the reflective diffusion lens 54. Accordingly, the backlight unit 50 may supply a light to the display panel 20.

The diffusion plate 40 may include a diffusion sheet 41 and a prism sheet 43.

The diffusion sheet 41 may diffuse a light emitted from the backlight unit 50 so that a color and brightness may be uniformly appeared in an entire screen of the display apparatus 1. For example, when a light emitted from the backlight unit 50 is not uniformly supplied to an entire screen of the display panel 20, it may cause color mura. In addition, the color mura may occur due to a variety of reasons (e.g., the number and the arrangement of light sources 52 and the shape of the reflective diffusion lens 54).

To prevent this, the diffusion sheet 41 may be provided in the display apparatus 1 to diffuse a light emitted from the backlight unit 50 so that a brightness of an entire screen of the display panel 20 may be uniform.

A light passing through the diffusion sheet 41 may be diffused in a direction perpendicular to a surface of the diffusion sheet 41, and thus luminance may be rapidly reduced. The prism sheet 43 may increase the luminance of a light diffused by the diffusion sheet 41 by refracting or condensing the light.

The prism sheet 43 may include a prism pattern of a triangular prism shape, and the prism pattern may have a shape of a plurality of bands in which a plurality of prism patterns is disposed adjacent to each other. That is, the prism pattern may be formed to protrude toward the display panel 20 such that a ridge and a valley are repeatedly disposed in a row.

As illustrated in FIG. 2, the diffusion plate 40 may include a protection sheet 45 and a double brightness enhancement film 47.

The protection sheet 45 may be provided in a front side of the prism sheet 43. The protection sheet 45 may protect a variety of components constituting the backlight unit 50 from an external impact, and the protection sheet 45 may prevent foreign materials from being introduced into the variety of components constituting the backlight unit 50. Particularly, because a scratch is easily generated in the prism sheet 43, the protection sheet 45 may be provided in the front side of the prism sheet 43 so that it may be possible to prevent that the scratch damages in the prism sheet 43.

The double brightness enhancement film 47 may be provided in the front side of the protection sheet 45. The double brightness enhancement film 47 is also referred to as a reflective polarizing film that is a kind of a polarizing film. The double brightness enhancement film 47 may transmit a polarized light in parallel with a polarization direction of the double brightness enhancement film 47, among lights emitted from the backlight unit 50, and may reflect a light in a different direction from the polarization direction of the double brightness enhancement film 47. The reflected light may be recycled back to the backlight unit 50 so as to improve the luminance of the display apparatus 10.

The reflective sheet 55 may be implemented in the form of a flat shape, and alternatively, may be implemented in a shape in which opposite ends of the reflective sheet 55 are tilted toward the display panel 20. That is, the reflective sheet 55 may be implemented in various shapes so that a maximum light emitted from the reflective diffusion lens 54 may be emitted to the display panel 20. The reflective sheet 55 is not limited to a specific shape.

FIG. 3 illustrates that the reflective sheet 55 is provided in the rear side of the circuit board 53, but is not limited thereto. The reflective sheet 55 may be attached to the front side of the circuit board 53.

The reflective diffusion lens 54 may be formed of a resin material having transparency. According to an exemplary embodiment, the reflective diffusion lens 54 may be implemented by one or the combination of polycarbonate (PC), poly methyl methacrylate (PMMA), and acrylic, but is not limited thereto. The reflective diffusion lens 54 may be implemented by a well-known material(e.g., a glass material).

Referring to FIG. 3, a light emitted from the light source 52 may be incident to the reflective diffusion lens 54. Accordingly, the reflective diffusion lens 54 may emit the light to an outer surface, which is a lateral surface of the reflective diffusion lens 54. According to an angle or a direction of a light emitted from the reflective diffusion lens 54, the presence of a color mura of the display panel 20 may be determined. As the light emitted from the reflective diffusion lens 54 is widely diffused, the number of light source 53 mounted to the light source 52 may be reduced. In addition, as the light emitted from the reflective diffusion lens 54 is widely diffused, a distance between the display panel 20 and the light source 52 may be reduced and thus a thickness of the display apparatus 1 is reduced. Therefore, according to an exemplary embodiment, the reflective diffusion lens 54 may diffuse the light more widely so that the number of the light source 52 may be reduced and the thickness of the display apparatus 1 may be reduced.

Hereinafter the structure of the reflective diffusion lens 54 will be described in details.

Figure 4:
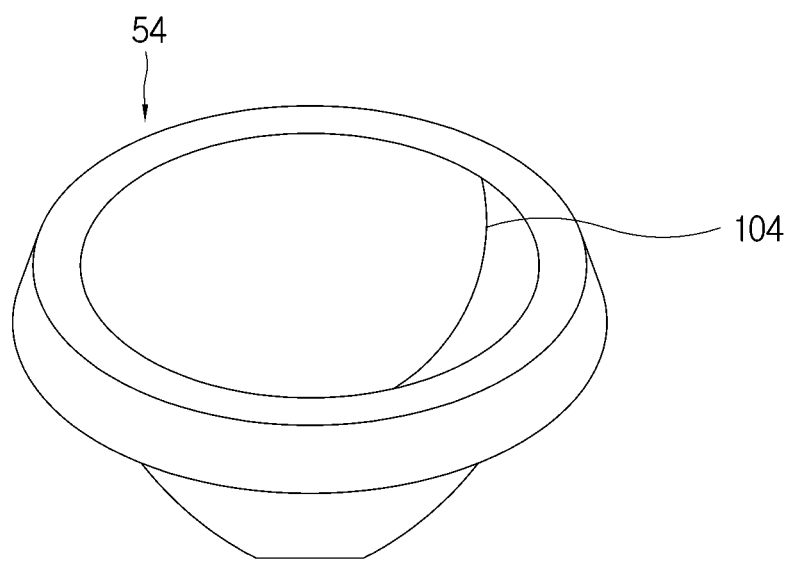
FIG. 4 is a perspective view of a reflective diffusion lens in accordance with an exemplary embodiment.
Figure 5:
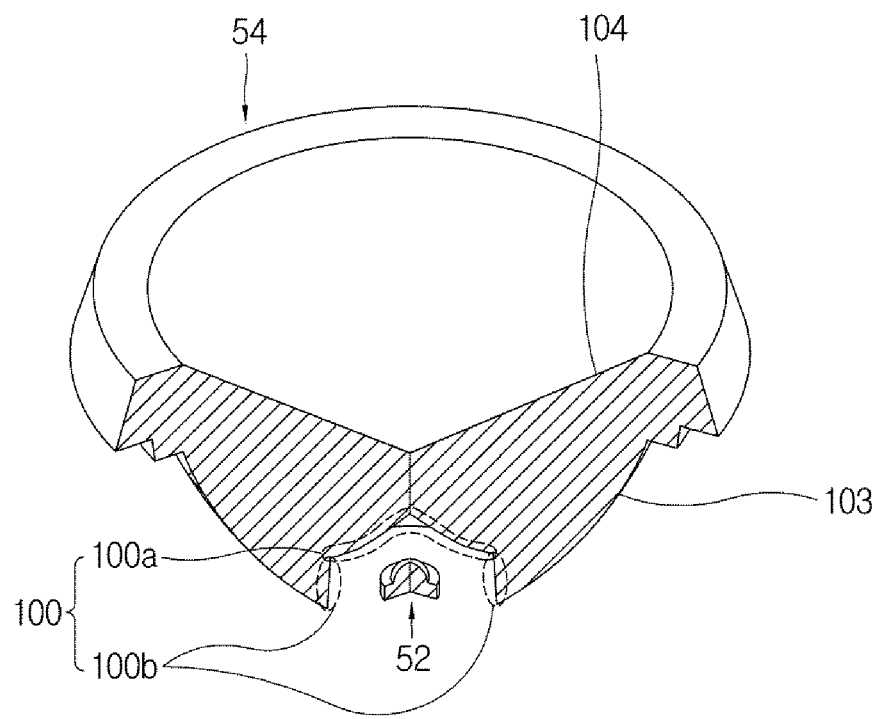
FIG. 5 is a cross-sectional view of a reflective diffusion lens in accordance with an exemplary embodiment.

FIG. 4 is a perspective view of a reflective diffusion lens in accordance with an exemplary embodiment and FIG. 5 is a cross-sectional view of a reflective diffusion lens in accordance with an exemplary embodiment.

Referring to FIGS. 4 and 5, the overall shape of the reflective diffusion lens 54 may be similar to a shape of cutting a portion of a cone shape. As illustrated in FIG. 5, on a bottom of the reflective diffusion lens 54, a recessed portion may be provided to place the light source 52. In addition, a lateral surface of the reflective diffusion lens 54 may be implemented in a circular shape having a certain thickness. Hereinafter an inner surface of the lateral surface of the reflective diffusion lens 54 may be referred to as a reflective surface 104, and an outer surface of the lateral surface of the reflective diffusion lens 54 may be referred to as a lateral surface 103. Hereinafter, a lower surface of the reflective diffusion lens 54 to which a light emitted from the light source 52 is incident may be referred to as an incident surface 100. In addition, the incident surface 100 may be around the recessed portion in which the light source 52 is placed.

The incident surface 100 may be a surface to which a light emitted from the light source 52 is incident, and may refract the light incident from the light source 52. The incident surface 100 may be formed to refract an incident light to the lateral surface 103 or the reflective surface 104.

For example, the incident surface 100 may refract a light emitted from the light source 52 to the lateral surface 103 or the reflective surface 104 according to an incident angle of a light that is emitted from the light source 52 and incident to the incident surface 100. The incident angle may represent an angle of a light incident with respect to an optical axis of the light source 52.

According to an exemplary embodiment, when the incident angle is larger than a predetermined angle, the incident surface 100 may allow an incident light to be refracted to the lateral surface 103. To response, when the incident angle is smaller than a predetermined angle, the incident surface 100 may refract an incident light to the reflective surface 104. That is, the reflective diffusion lens 54 may be designed to allow a light, which is incident to a first specific area of the incident surface 100, to be refracted to the reflective surface 104 because the incident angle of the light incident to the first specific area is smaller than the predetermined angle. In addition, the reflective diffusion lens 54 may be designed to allow a light, which is incident to in a second area of the incident surface 100, to be refracted to the lateral surface 103 because the incident angle of the light incident to the second specific area is larger than the predetermined angle.

Therefore, according to an area, to which a light is incident, among the entire area of the incident surface 100, a light refracted by the incident surface 100 may be directed to the lateral surface 103 or the reflective surface 104. The shape of the reflective diffusion lens 54 may be implemented by a designer when designing the reflective diffusion lens 54.

For example, referring to FIG. 5, the incident surface 100 may include a first incident surface 100a and a second incident surface 100b. The incident surface 100 may include the first incident surface 100a and the second incident surface 100b.

According to an exemplary embodiment, the first incident surface 100a may be formed to refract an incident light to the reflective surface 104, and the second incident surface 100b may be formed to refract an incident light to the lateral surface 103.

Meanwhile, a light refracted to the reflective surface 104 may reflected the reflective surface 104 and directed to the lateral surface 103. Hereinafter "reflection" may represent total reflection, which means that a light incident to a boundary surface is totally reflected by the boundary surface. Therefore, a light refracted from the first incident surface 100a to the reflective surface 104 may be totally reflected by the reflective surface 104 and directed to the lateral surface 103.

The lateral surface 103 may refract or reflect a light according to an incident angle of an incident light upon the lateral surface 103. That is, the reflective surface 104 may be formed to totally reflect an incident light, but the lateral surface 103 may be formed to reflect or refract an incident light according to the incident angle.

The lateral surface 103 may be implemented in the form of a parabola or curved surface. According to an exemplary embodiment, the shape of the lateral surface 103 may be formed in a way that an angle between the optical axis 200 and a tangent of the lateral surface 103 decreases along with the increasing distance from the light source 52. A description thereof will be described later.

According to an exemplary embodiment, when a light incident from the second incident surface 100b is refracted and directed to the lateral surface 103, the lateral surface 103 may reflect the incident light to the reflective surface 104. When a light is reflected by the lateral surface 103, it may represent a total reflection that an incident light is totally reflected. Therefore, a light incident to the lateral surface 103 may be totally reflected and directed to the reflective surface 104 without being emitted toward the outside.

Alternatively, when a light reflected by the reflective surface 104 is directed to the lateral surface 103, the lateral surface 103 may be formed to refract an incident light and totally emit the incident light. Therefore, the reflective diffusion lens 54 may be configured to receive a light emitted from the light source 52 through the incident surface 100, and emit the incident light through the lateral surface 103.

As illustrated in FIG. 3, an emitted light may be emitted toward an upper side or a lower side with respect to a perpendicular direction 201 of the optical axis 200 of the light source 52. That is, the reflective diffusion lens 54 may emit a light in any directions except for the perpendicular direction 201 of the optical axis 200 of the light source 52.

From FIG. 3, it can be understood that a light emitted in the perpendicular direction 201 may be reflected by the reflective sheet 55 to a position in which the display panel 20 is placed. Accordingly, the light may not directly go the optical axis 200 thereby reducing the optical efficiency.

Because a structure of the reflective sheet 55 is fixed, a light emitted in the perpendicular direction 201 may be reflected to a certain area by the reflective sheet 55. Therefore, it may cause a color mura and may be difficult to reduce the number of the light source 52 for the prevention of the color mura. According to an exemplary embodiment, the reflective diffusion lens 54 may emit a light, which is originally emitted in the perpendicular direction 201 from the light source 52, to the lower direction or the upper direction with respect to the perpendicular direction 201, thereby improving the optical efficiency. In addition, according to an exemplary embodiment, the reflective diffusion lens 54 may emit a light to diffuse widely so that an optical distance may be reduced and the number of the light source 52 may be reduced.

Hereinafter how a light emitted from the light source 52 is transmitted through the reflective diffusion lens 54 will be described.

Figure 6:
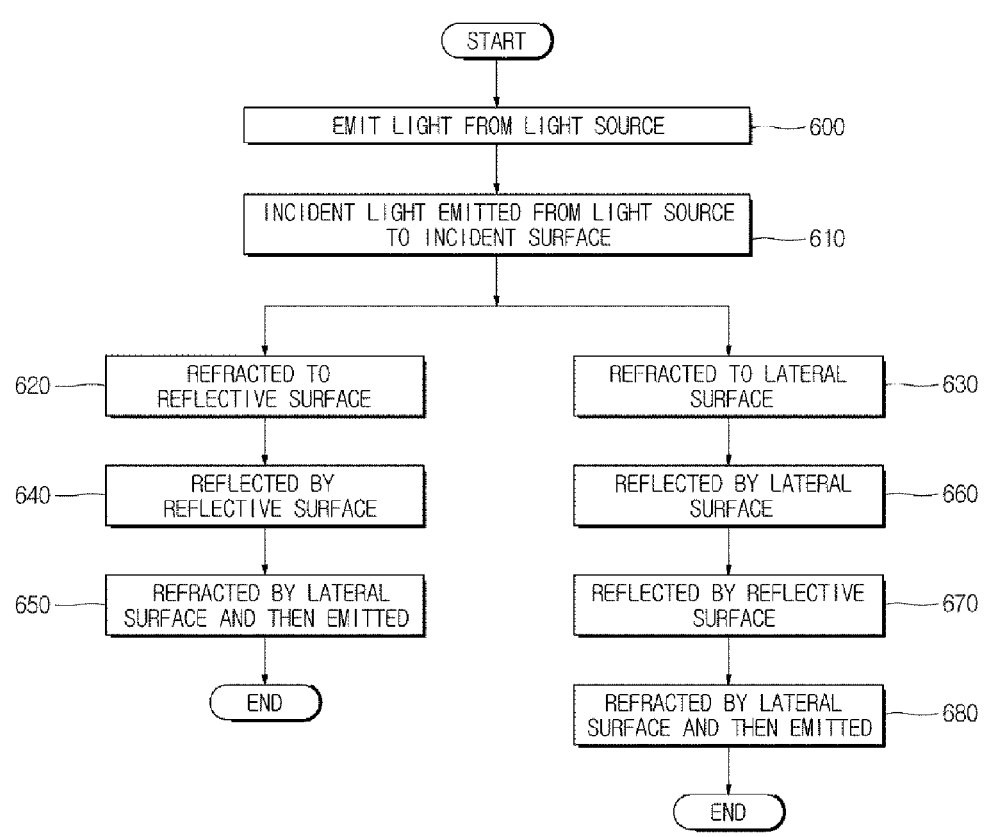
FIG. 6 is a flow chart of a pathway of light in the reflective diffusion lens in accordance with an exemplary embodiment.
Figure 7:
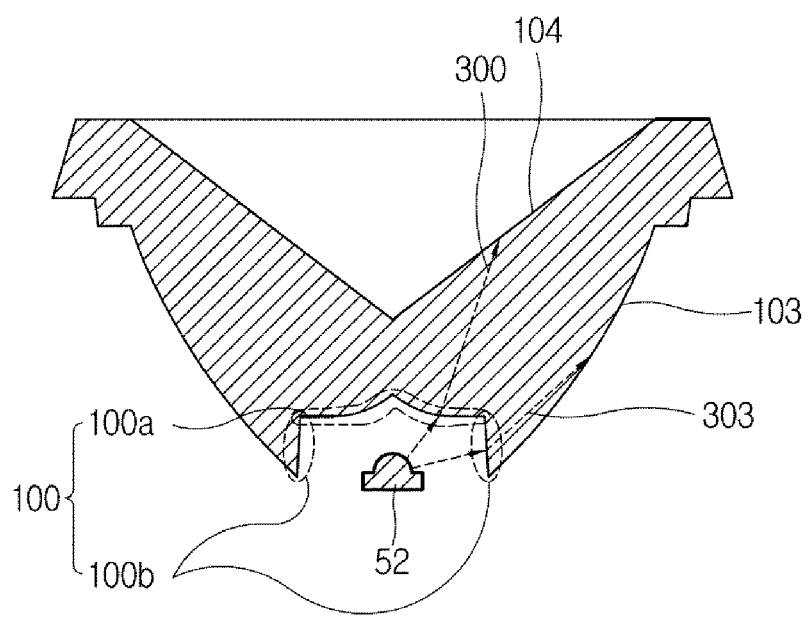
FIG. 7 is a view of pathways of two lights having different incident angle emitted from a light source in accordance with an exemplary embodiment.
Figure 8:
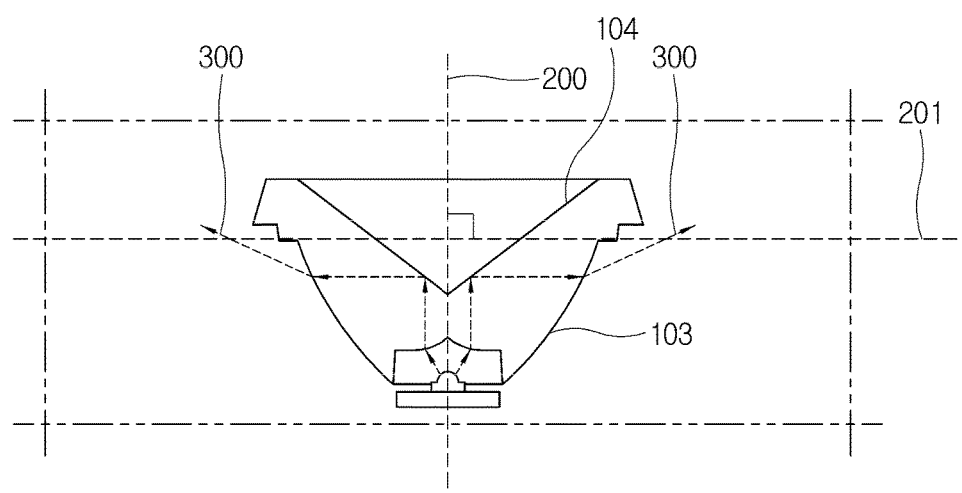
FIG. 8 is a view of a pathway of a light when a light refracted by an incident surface is directed to a reflective surface in accordance with an exemplary embodiment.
Figure 9:
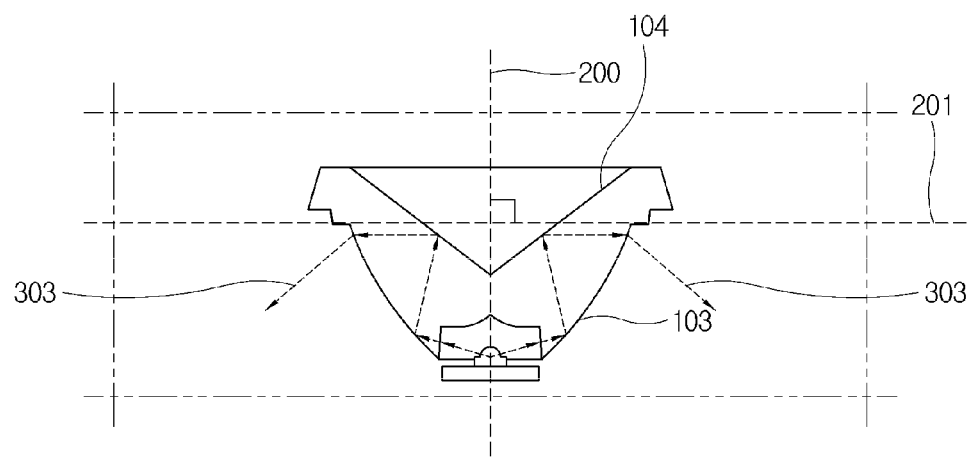
FIG. 9 is a view of a pathway of a light when a light refracted by an incident surface is directed to a lateral surface in accordance with an exemplary embodiment.
Figure 10:
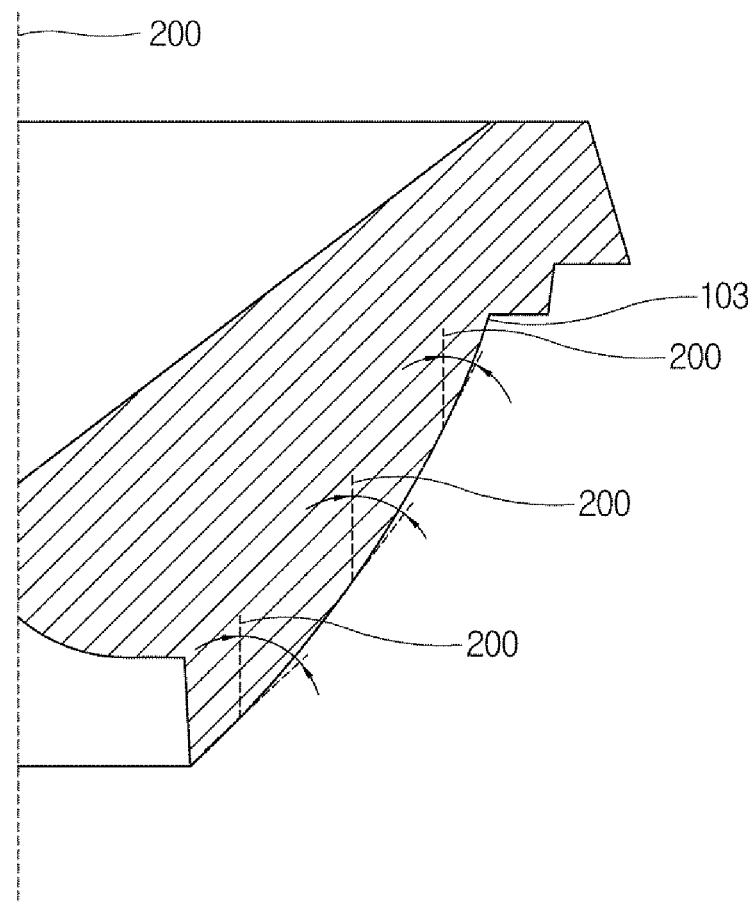
FIG. 10 is a view of a comparison an optical axis with a shape of the lateral surface in accordance with an exemplary embodiment.

FIG. 6 is a flow chart of a pathway of light in the reflective diffusion lens in accordance with an exemplary embodiment, and FIGS. 7 to 9 are views illustrating a pathway of light through reflective diffusion lens in accordance with exemplary embodiments. FIG. 10 is a view of a comparison an optical axis with a shape of the lateral surface in accordance with an exemplary embodiment.

The display apparatus may emit a light by using a light source mounted to a circuit board of a backlight unit (600). The display apparatus may emit a light in various directions through a reflective diffusion lens so as to diffuse the light in various angles. Hereinafter a pathway of the light in the reflective diffusion lens will be described.

The light emitted from the light source may be incident to an incident surface of the reflective diffusion lens (610). The reflective diffusion lens may refract the light emitted from the light source to a reflective surface (620) or refract the light to a lateral surface (630) according to an incident angle of the light emitted from the light source.

Referring to FIG. 7, the reflective diffusion lens may receive the light emitted from the light source through the incident surface 100. The light source 52 may emit a light in all directions. Accordingly, the light emitted from the light source 52 may be incident to the first incident surface 100a or the second incident surface 100b. That is, the light emitted from the light source 52 may be incident to any one of the first incident surface 100a or the second incident surface 100b according to an emergent angle of the light emitted from the light source 52.

When a light is incident to a certain area of the incident surface 100, the reflective diffusion lens may refract the light to the reflective surface 104. In addition, when a light is incident to the other area of the incident surface 100, the reflective diffusion lens may refract the light to the lateral surface 103. It may be predetermined by a designer when designing the reflective diffusion lens.

As illustrated in FIG. 7, a first light 300 incident to the first incident surface 100a may be refracted to the reflective surface 104. In addition, a second light 303 incident to the second incident surface 100b may be refracted to the lateral surface 103.

Hereinafter pathways of a light incident to the first incident surface 100a, which is refracted to the reflective surface (corresponding to 620 in FIG. 6), and a light incident to the second incident surface 100b, which is refracted to the lateral surface (corresponding to 630 in FIG. 6), will be described.

Referring to FIG. 6, when a light is refracted to the reflective surface 104 by the incident surface 100a (620), the reflective surface 104 of the reflective diffusion lens 54 may reflect a refracted light (640). As previously mentioned, a reflection here may represent a total reflection. The reflective diffusion lens 54 may be formed to allow a light reflected by the reflective surface 104 to be directed to the lateral surface 103.

The lateral surface 103 of the reflective diffusion lens 54 may refract a light reflected by the reflective surface 104 and thus emit the reflected light to the outside (650). FIG. 8 illustrates a pathway in which a light reflected by the reflective surface 104 is refracted through the lateral surface 103 and emitted. Referring to FIG. 8, as previously mentioned, the first light 300 incident to the first incident surface 100 may be reflected by the reflective surface 104 and directed to the lateral surface 103. And then, the first light 300 may be refracted by the lateral surface 103 and emitted to the outside.

In FIG. 8, based on an angle of the first light 300 emitted from the lateral surface 103, the first light 300 may be emitted to the upper direction with respect to the perpendicular direction 201 of the optical axis 200. Besides, a light emitted after being refracted by the lateral surface 103 may be emitted to the lower direction from the perpendicular direction 201 of the optical axis 200.

An incident/emergent angle in which a light is emitted may vary according to a variety of factors, e.g. an incident angle of light, the shape of the reflective surface 104 and the lateral surface 103 or the refractive index. According to an exemplary embodiment, the above-mentioned factors of the reflective diffusion lens 54 may be set to prevent a light from being emitted in the perpendicular direction 201 of the optical axis 200. Accordingly, according to an exemplary embodiment, the reflective diffusion lens 54 may emit a light in a wider range of angle, thereby improving the light diffusion efficiency. In addition, according to an exemplary embodiment, the reflective diffusion lens may improve the light diffusion efficiency so that the number of the light source 52 may be reduced, which is needed to prevent the color mura, and thus it may directly effect on the cost reduction of the display apparatus 1.

Hereinafter a pathway of a light in which a light incident to the second incident surface 100b will be described.

Referring to FIG. 6, when a light incident to the second incident surface 100b is refracted to the lateral surface 103 (630), the lateral surface of the reflective diffusion lens may reflect a light refracted by the second incident surface to the reflective surface (660) because the incident angle of the light is larger than a predetermined angle. In this case, a reflection may represent a total reflection. That is, the lateral surface 103 of the reflective diffusion lens may not emit a light refracted by the second incident surface 100b but may totally reflect the refracted light to the reflective surface 104.

The reflective surface 104 of the reflective diffusion lens 54 may totally reflect a light reflected by the lateral surface 103 back to the lateral surface 103 (670). Accordingly, the lateral surface 103 of the reflective diffusion lens 54 may refract a light reflected by the reflective surface and emit the refracted light because the incident angle of the reflected light is smaller than the predetermined angle at this time (680).

FIG. 9 is a view illustrating above-mentioned pathway of a light. Referring to FIG. 9, the second light 303 that is incident to a certain area of the incident surface may be refracted to the lateral surface 103. As illustrated in FIG. 7, the second light 303 incident to the second incident surface 100b may be refracted to the lateral surface 103. The second light 303 refracted to the lateral surface 103 may be reflected by the lateral surface 103. The lateral surface 103 may be formed to allow a portion of the second light 303 to be refracted and the other portion of the second light 303 to be reflected to the reflective surface 104. In addition, the lateral surface 103 may be formed in a way that the second light 303 may be reflected totally to be directed to the reflective surface 104. Therefore, the lateral surface 103 may be formed to prevent the second light 303 incident from the second incident surface 100b from being emitted totally.

Meanwhile, the reflective surface 104 may reflect the second light 303 reflected by the lateral surface 103 back to the lateral surface 103. In this case, the lateral surface 103 may refract the second light 303 reflected by the reflective surface 104 and emit the refracted light. As illustrated in FIG. 9, the lateral surface 103 may emit the second light 303 to the lower direction with respect to the perpendicular direction 201 of the optical axis 200. In addition, the lateral surface 103 may emit the second light 303 to the upper direction with respect to the perpendicular direction 201 of the optical axis 200. That is, the lateral surface 103 may allow an angle in which a light is emitted from the lateral surface 103 to be an angle except for a vertical angle of the optical axis 200.

As previously mentioned, the lateral surface 103 of the reflective diffusion lens may be formed to allow a light to be refracted and emitted or to allow a light to be totally reflected to prevent from being emitted. In addition, the lateral surface 103 may be formed to allow a light to be emitted in an angle except for the vertical angle of the optical axis 200.

Hereinafter the shape of the lateral surface 103 will be described in details.

As illustrated in FIG. 10, the lateral surface 103 may be implemented in the form of a parabola or a curved surface. Particularly, the parabola or the curved surface may not represent a parabola or a curved surface protruding toward an inner side of the reflective diffusion lens, but represent a parabola or a curved surface protruding toward an outer side of the reflective diffusion lens.

The lateral surface 103 may be formed in a way that an angle between a circuit board to which the reflective diffusion lens is mounted and a tangent with the lateral surface 103 is larger as being from a lower portion thereof to an upper portion thereof.

In addition, the lateral surface 103 may be formed in a way that an angle between the optical axis 200 and a tangent of the lateral surface 103 decreases along with the increasing distance from the light source 52. Referring to FIG. 10, the angle between the optical axis 200 and a tangent of the lateral surface 103 may be smaller as the lateral surface 103 is far from the light source 52.

Also, terms used herein are used to describe exemplary embodiments, and thus there is no intention to limit or restrict the present disclosure. Expression in the singular should be understood to include multiple representations unless it represents clearly different meaning in the context. Terms such as "comprising", "providing" or "having" are intended to designate the presence of features, numbers, steps, operations, elements, or components or a combination thereof, but it does not preclude the presence or addition of a part or a combination of these things.

It will be understood that, although the terms "first," "second," "third," etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

In the following description, terms such as "part," "module" and "unit" indicate a unit for processing at least one function or operation, wherein the unit and the block may be embodied as software or hardware, such as Field Programmable Gate Array (FPGA), Application Specific Integrated Circuit (ASIC), or embodied by combining hardware and software. However, the term "part" "module" and "unit" are not limited to software or hardware. Further, "part," "module" and "unit" may be constructed to exist in an addressable storage module, or to play one or more processors. "part," "module" and "unit" includes elements (e.g., software elements, object-oriented software elements, class elements and task elements), processors, functions, properties, procedures, subroutines, segments of a program code, drivers, firmware, a microcode, a circuit, data, a database, data structures, tables, arrays, and variables.

Although a few exemplary embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A reflective diffusion lens comprising:
   an incident surface configured to refract a light incident from a light source;
   a lateral surface configured to reflect the light refracted by the incident surface when the light incident from the light source is incident to an area except for a first predetermined area of the incident surface; and
   a reflective surface configured to reflect the light reflected by the lateral surface,
   wherein the lateral surface is further configured to refract the light reflected by the reflective surface and emit the refracted light in an upper direction or a lower direction with respect to a direction perpendicular to an optical axis of the light source; and
   wherein the incident surface, in response to receiving a light incident from the light source to the first predetermined area of the incident surface, is further configured to refract the light to the reflective surface, and refracts the light to the lateral surface in response to receiving a light incident from the light source to the area except for the first predetermined area.

2. The reflective diffusion lens of claim 1 wherein the lateral surface has a curved surface, in which an angle between the optical axis of the light source and a tangent of the lateral surface decreases along with the increasing distance from the light source.

3. A display apparatus comprising:
   a light source configured to emit a light; and
   a reflective diffusion lens configured to emit a light emitted from the light source to an upper direction or a lower direction with respect to a direction perpendicular to an optical axis of the light source through an incident surface, a lateral surface, and a reflective diffusion surface,
   wherein the incident surface refracts the light emitted from the light source to one of the lateral surface and the reflective surface according to an incident angle of light emitted from the light source.

4. The display apparatus of claim 3 further comprising:
   a reflective sheet disposed in a lower side of the light source and configured to reflect a light emitted by the reflective diffusion lens.

5. The display apparatus of claim 3 wherein the lateral surface reflects or refracts the light entered thereto according to an incident angle of the light.

6. The display apparatus of claim 5 wherein the lateral surface, when the light emitted from the light source is refracted from the incident surface to the reflective surface according to an incident angle, refracts the light reflected by the reflective surface.

7. The display apparatus of claim 3 wherein the lateral surface, when the light emitted from the light source is refracted from the incident surface to the lateral surface according to an incident angle, reflects the light refracted by the incident surface to the reflective surface.

8. The display apparatus of claim 3, wherein the lateral surface has a curved surface, in which an angle between the optical axis of the light source and a tangent of the lateral surface decreases along with the increasing distance from the light source.

9. The display apparatus of claim 3 further comprising:
a reflective sheet disposed in a rear side of the reflective diffusion lens and configured to reflect the light emitted from the reflective diffusion lens.

10. The display apparatus of claim 3 further comprising:
a display panel configured to generate an image based on the light emitted from the reflective diffusion lens.

* * * * *